Feb. 15, 1949.   A. A. BERESTNEFF   2,461,513
CONTROL ARRANGEMENT FOR ABSORPTION
REFRIGERATION SYSTEMS
Filed July 13, 1946
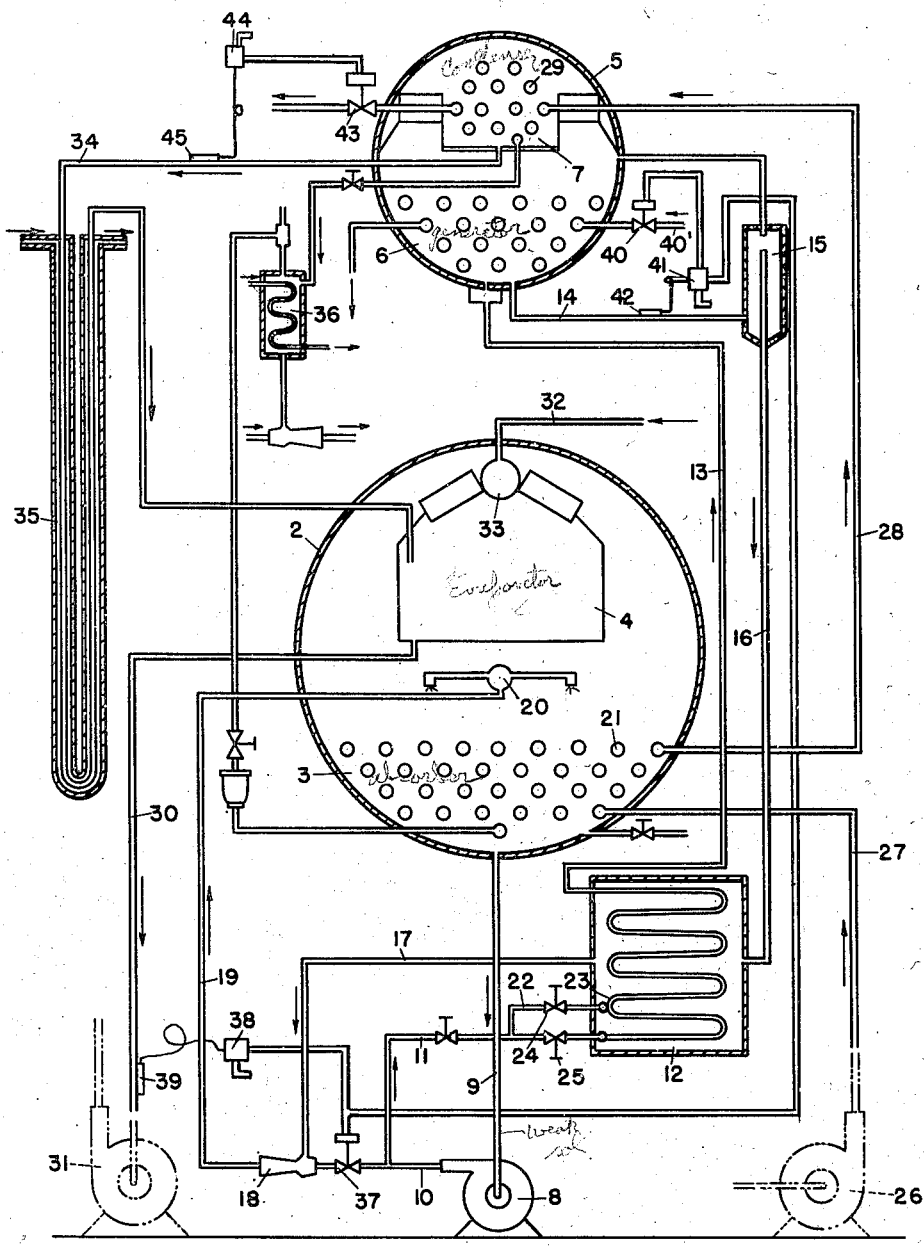
INVENTOR.
Alexis A. Berestneff
BY Patented Feb. 15, 1949

2,461,513

UNITED STATES PATENT OFFICE 2,461,513

CONTROL ARRANGEMENT FOR ABSORPTION REFRIGERATION SYSTEMS

Alexis A. Berestneff, Syracuse, N. Y., assignor to Carrier Corporation, Syracuse, N. Y., a corporation of Delaware Application July 13, 1946, Serial No. 683,388

6 Claims. (Cl. 62—119)

This invention relates to refrigeration systems and more particularly to an absorption refrigeration system including a control arrangement adapted to permit operation of the generator of the system at higher concentrations of solution.

In the co-pending application of Alexis A. Berestneff entitled "Absorption refrigeration systems," Serial No. 683,387, filed July 31, 1946, and in the co-pending application of Alexis A. Berestneff and William L. McGrath, entitled "Control arrangement for absorption refrigeration systems," Serial No. 683,390, filed July 31, 1946, there are disclosed and claimed an absorption refrigeration system and a control arrangement therefor in which the present invention may be readily included. It will be understood, of course, the present invention is not limited to its use in connection with the absorption refrigeration system or the control arrangement therefor described in the co-pending applications above referred to but may be embodied in any type of absorption refrigeration system in which it is desired to obtain satisfactory operation of the system at higher concentrations of solution in the generator.

The chief object of the present invention is to provide an absorption refrigeration system including a control arrangement adapted to permit satisfactory operation of the system at higher concentrations of solution in the generator.

An object of the invention is to provide an absorption refrigeration system including a heat exchanger adapted to place strong and weak solutions in heat exchange relation with one another and in which a portion of the heat exchanger may be bypassed.

A further object is to provide an absorption refrigeration system including a heat exchange member for strong and weak solutions and means for rendering a portion of the heat exchange member ineffective thereby permitting satisfactory operation of the system at higher concentrations of solution in the generator. Other objects of my invention will be readily perceived from the following description.

This invention relates to an absorption refrigeration system which comprises in combination an absorber, an evaporator, a generator and a condenser, a line connecting the absorber and the generator, a second line connecting the generator and the absorber, means for passing weak solution and strong solution respectively through said lines, heat exchange means disposed in said lines for placing the solutions in heat exchange relation, and means for rendering a portion of the heat exchange means ineffective whereby operation of the system may be conducted at a higher concentration of solution leaving the generator.

The attached drawing illustrates diagrammatically an absorption refrigeration system embodying the present invention.

Referring to the drawing, there is shown a horizontally extending shell 2 having an absorber 3 disposed at the bottom thereof and an evaporator 4 disposed in the upper portion of the shell. A second shell 5 includes a generator 6 disposed at the bottom thereof and a condenser 7 disposed in the upper portion of shell 5. Weak solution is withdrawn from absorber 3 by pump 8 through line 9 and is forwarded to the generator 6 through line 10, line 11 forming a continuation of line 10, heat exchanger 12 as hereinafter described, and line 13. Strong solution is withdrawn from generator 6 through line 14, overflow arrangement 15, line 16, heat exchanger 12, line 17 to ejector 18 which forwards strong solution through line 19 to spray arrangement 20 adapted to spray the solution over the tubes 21 of absorber 3.

The term "weak solution" is used herein to define a solution containing a large amount of refrigerant so that the solution is weak in absorbing properties. The term "strong solution" defines a solution which is relatively deficient in refrigerant and consequently a solution which possesses enhanced properties of refrigerant absorption.

Various combinations of refrigerant and absorber may be used in the system described. A solution consisting of lithium bromide and water is highly satisfactory. Other salt solutions may be used if desired in the system. When the system is operated at high temperature (above freezing temperature) a solution of lithium chloride and water or a solution of sodium hydroxide and water, for example, may be used. When the system is used to obtain low temperature, ammonia, for example, may be employed as a refrigerant.

Heat exchange member 12 is disposed in position to place weak solution passing from the absorber to the generator and strong solution passing from the generator to the absorber in heat exchange relation with one another to permit operation of the system at higher efficiency. Under some conditions, it is desirable to operate the system at higher concentrations of solution leaving the generator than is customary during normal operation of the system. For this purpose, a bypass line 22 is provided connecting line 11 with a desired loop 23 of the heat exchanger 12. A manually operated valve 24 is disposed in line 22.

A similar valve 25 may be disposed in line 11 as shown. It will be understood, of course, valves 24 and 25 may be automatically actuated by any suitable means. When it is desired to bypass or to cut out some portion of the heat exchanger surface, valve 24 may be opened and valve 25 throttled or closed thus permitting weak solution to flow through line 22 to bypass a portion of the heat exchanger surface as shown. Solution then leaving the heat exchanger is at a higher temperature which will permit operation at a higher concentration of solution leaving the generator without danger of approaching the freezing line.

A pump 26 passes cooling or condensing water through line 27 to the tubes 21 of absorber 3. Cooling water after its passage through the tubes of absorber 3 is directed through line 28 to the tubes 29 of condenser 7.

Chilled water leaves the evaporator through line 30 and is circulated to the heat exchange coil (not shown) of an air conditioning system, for example, by means of pump 31. The chilled water is returned from the air conditioning system through line 32 and is sprayed by means of spray arrangement 33 in the evaporator 4. Pressure in shell 2 is such that the refrigerant sprayed therein is flash cooled. The vapor passes downward to be absorbed by the solution in absorber 3 while the cooled refrigerant remains in evaporator 4 and may be withdrawn therefrom, as described above, through line 30. Line 34 serves to forward condensate from condenser 7 to evaporator 4. A precooler arrangement 35 may be provided in line 34 so that the condensate forwarded to the evaporator is maintained at a desired temperature.

Any suitable purge arrangement 36 may be provided to withdraw non-condensible gases from the absorber and the condenser.

A valve 37 is disposed in line 10 to throttle the volume of weak solution passing to generator 6 and ejector 18. Valve 37 is actuated by thermostat control 38 responsive to the temperature of chilled refrigerant leaving evaporator 4 as registered by bulb 39 disposed in or adjacent line 30. A valve 40 in steam line 40' determines the volume of steam passing into the tubes of generator 6. Valve 40 is actuated by control 41 responsive to the temperature of strong solution leaving the generator as registered by bulb 42 placed in or adjacent to line 14. A valve 43 placed in the cooling water line serves to control the volume of cooling water passing through the tubes of absorber 3 and condenser 7. Valve 43 is actuated by control 44 in response to the temperature of condensate leaving condenser 7 by means of bulb 45 placed in or adjacent condensate line 34.

The control arrangement so described is disclosed and claimed in the co-pending application of Alexis A. Berestneff and William L. McGrath above referred to and reference is made to such application for a more complete description of the arrangement and the manner in which it controls operation of the absorption refrigeration system disclosed in the co-pending application of Alexis A. Berestneff above referred to. The present invention is concerned primarily with the provision of means enabling operation of an absorption refrigeration system of this type at higher concentrations of solutions leaving the generator.

In operation, assume that it is desired to operate the system at higher concentrations of solution leaving the generator, a portion of heat exchange member 12 may be bypassed as described above. To bypass a portion of the heat exchange surface, valve 24 may be opened and valve 25 throttled or closed, permitting weak solution to flow through line 22 to loop 23 of heat exchanger 12 without passing through the complete heat exchange surface. Solution then leaving the heat exchanger is at a higher temperature which will permit operation of the system at a higher concentration of solution leaving the generator.

The control arrangement provided by the present invention permits operation of the generator of an absorption refrigeration system at higher concentrations of solution without danger of crystallization of the solution. Such arrangement may be embodied in an absorption refrigeration system of the type described at minor expense and serves effectively to provide desired variations in concentration of solution leaving the generator in accordance with conditions encountered in certain uses.

While I have described and illustrated a preferred embodiment of my invention, it will be understood my invention is not limited thereto since it may be otherwise embodied within the scope of the following claims.

I claim:

1. In an absorption refrigeration system including a generator and an absorber, a line connecting the absorber and the generator, a second line connecting the generator and the absorber, a heat exchanger disposed in said lines for placing solutions passing therethrough in heat exchange relation, said exchanger including a casing member and a coil member having the sections of the coil disposed in series extending through the casing, strong solution flowing through one of said members and weak solution flowing through the other of said members in an opposite direction, and means for operating the system at a concentration of solution leaving the generator greater than concentration of solution leaving the generator during normal operation of the system by rendering at least one of the coil sections ineffective for substantial heat transfer.

2. In an absorption refrigeration system, the combination of an absorber, an evaporator, a generator and a condenser, a line connecting the absorber and the generator, a second line connecting the generator and the absorber, a pump for withdrawing weak solution from the absorber and for supplying the weak solution through said first line to the generator, an ejector adapted to receive strong solution from the generator through the second line and to supply the strong solution to the absorber, a heat exchange member adapted to place solutions passing through said lines in heat exchange relation with one another, and means for rendering a portion of the heat exchange member ineffective whereby operation of the system may be conducted at a higher concentration of solution leaving the generator.

3. In an absorption refrigeration system, the combination of an absorber, an evaporator, a generator and a condenser, means for supplying weak solution from the absorber to the generator, means for supplying strong solution from the generator to the absorber, a heat exchanger in said weak and strong solution supply means for placing the strong and weak solutions in heat exchange relation with one another, said exchanger including a casing member and a coil member having the sections of the coil disposed in series extending through the casing, strong solution flowing through one of said members and weak solution flowing through the other of said members and means for operating the system at a concentration of solution leaving the generator greater than concentration of solution leaving the generator during normal operation of the system by rendering at least one of the coil sections ineffective for substantial heat transfer.

4. In an absorption refrigeration system, the combination of an absorber, an evaporator, a generator and a condenser, a line connecting the absorber and the generator, a second line connecting the generator and the absorber, means for supplying weak solution from the absorber through said first line to the generator, means for supplying strong solution from the generator through said second line to the absorber, a heat exchanger disposed in said lines for placing solution passing therethrough in heat exchange relation, said exchanger including a casing member and a coil member having the sections of the coil disposed in series extending through the casing, strong solution flowing through one of said members and weak solution flowing through the other of said members in an opposite direction, and means for operating the system at a concentration of solution leaving the generator greater than concentration of solution leaving the generator during normal operation of the system by rendering at least one of the coil sections ineffective for substantial heat transfer.

5. An absorption refrigeration system according to claim 4 in which the means for operating the system at a concentration of solution leaving the generator greater than concentration of solution leaving the generator during normal operation of the system comprises a bypass line connecting the first line with a section of the coil, a valve in said bypass line and a second valve in said first line, opening of said first valve and closing of said second valve opening the bypass and rendering such section of the coil ineffective for substantial heat transfer.

6. In a heat exchanger for an absorption refrigeration system, a casing member and a coil member having the sections of the coil disposed in series extending through the casing, strong solution flowing through one of said members and weak solution flowing through the other of said members and means for operating the system at a concentration of solution leaving the generator greater than concentration of solution leaving the generator during normal operation of the system by rendering at least one of the coil sections ineffective for substantial heat transfer.

ALEXIS A. BERESTNEFF.

REFERENCES CITED

The following references are of record in the file of this patent:

UNITED STATES PATENTS

| Number | Name | Date |
|---|---|---|
| 406,345 | Gray et al. | July 2, 1889 |

Certificate of Correction

February 15, 1949.

Patent No. 2,461,513.

ALEXIS A. BERESTNEFF

It is hereby certified that errors appear in the printed specification of the above numbered patent requiring correction as follows:

Column 1, lines 8 and 12, for "July 31, 1946" read *July 13, 1946*; and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*